United States Patent
Guelbenzu Michelena et al.

(10) Patent No.: US 10,509,386 B2
(45) Date of Patent: Dec. 17, 2019

(54) METHOD FOR THE CONTROL OF POWER RAMP-RATES MINIMIZING POWER STORAGE REQUIREMENTS IN INTERMITTENT POWER GENERATION PLANTS

(71) Applicant: ACCIONA ENERGIA, S.A., Sarriguren (Navarra) (ES)

(72) Inventors: Eugenio Guelbenzu Michelena, Sarriguren (ES); Asun Padros Razquin, Sarriguren (ES); Daniel Rabal Echeverria, Sarriguren (ES); Luis Marroyo Palomo, Pamplona (ES); Javier Marcos Alvarez, Pamplona (ES); Iñigo De La Parra Laita, Pamplona (ES); Miguel Garcia Solano, Pamplona (ES)

(73) Assignee: ACCIONA ENERGIA, S.A., Sarriguren (Navarra) (ES)

( * ) Notice: Subject to any disclaimer, the term of this patent is extended or adjusted under 35 U.S.C. 154(b) by 960 days.

(21) Appl. No.: 14/952,233

(22) Filed: Nov. 25, 2015

(65) Prior Publication Data
US 2016/0154397 A1   Jun. 2, 2016

(30) Foreign Application Priority Data

Nov. 25, 2014   (EP) .................................... 14382470

(51) Int. Cl.
*G05B 19/10*   (2006.01)
*G05B 19/048*   (2006.01)
(Continued)

(52) U.S. Cl.
CPC .......... *G05B 19/10* (2013.01); *G05B 19/048* (2013.01); *H02J 3/24* (2013.01); *H02J 3/32* (2013.01);
(Continued)

(58) Field of Classification Search
CPC ......... G05B 19/10; G05B 19/048; H02J 3/24; H02J 3/32; H02J 3/383; Y02E 10/563; Y02E 10/566; Y02E 70/30
(Continued)

(56) References Cited

U.S. PATENT DOCUMENTS

2009/0295162 A1*  12/2009  Oohara .................... F03D 7/028
                                                                                        290/44
2011/0282514 A1*  11/2011  Ropp ...................... H02J 3/383
                                                                                        700/297
(Continued)

FOREIGN PATENT DOCUMENTS

WO    WO-2013188517    12/2013

OTHER PUBLICATIONS

Extended European Search Report dated May 21, 2015, EP Appln. No. 14382470.4, 7 pages.
(Continued)

*Primary Examiner* — Michael J Huntley
(74) *Attorney, Agent, or Firm* — Womble Bond Dickinson (US) LLP

(57) ABSTRACT

The present invention is a method for the control of power ramp-rates minimizing energy storage requirements in intermittent power generation plants, such as for example a photovoltaic solar plant, which minimizes the energy storage requirements approximately halving the size of storage systems necessary to comply with a maximum allowable ramp-rate given by a grid code regulation regarding the state of the art, reducing thus investment costs in the plant and/or carrying out a rationalized use of the energy storage system, in such a way that in order to achieve the same maximum fluctuation ramp, a minor use is done of the energy storage system, minimizing the losses and extending its working life, and therefore reducing the plant operational costs.

20 Claims, 3 Drawing Sheets

(51) Int. Cl.
　　　*H02J 3/24* 　　　(2006.01)
　　　*H02J 3/32* 　　　(2006.01)
　　　*H02J 3/38* 　　　(2006.01)

(52) U.S. Cl.
　　　CPC ...... *H02J 3/383* (2013.01); *G05B 2219/2639* (2013.01); *Y02E 10/563* (2013.01); *Y02E 10/566* (2013.01); *Y02E 70/30* (2013.01)

(58) Field of Classification Search
　　　USPC .......................................................... 700/295
　　　See application file for complete search history.

(56) References Cited

U.S. PATENT DOCUMENTS

| | | | | |
|---|---|---|---|---|
| 2014/0184136 | A1* | 7/2014 | Ture | H02J 7/0052 320/101 |
| 2016/0156226 | A1* | 6/2016 | Itaya | H02J 3/14 323/234 |
| 2016/0241041 | A1* | 8/2016 | Padros | H02J 3/32 |
| 2017/0324268 | A1* | 11/2017 | Hanada | H02J 3/32 |

OTHER PUBLICATIONS

Marcos, J., et al., "Storage requirements for PV power ramp-rate control", *Solar Energy 99*, (2014), 28-35.

\* cited by examiner

METHOD FOR THE CONTROL OF POWER RAMP-RATES MINIMIZING POWER STORAGE REQUIREMENTS IN INTERMITTENT POWER GENERATION PLANTS

OBJECT OF THE INVENTION

The present invention may be included in the technical field of methods for the control of power ramp-rates minimizing energy storage requirements in intermittent power generation plants.

The object of the present invention is a method for the control of power ramp-rates minimizing energy storage requirements in intermittent power generation plants, such as for example a photovoltaic solar plant, which minimizes the energy storage requirements approximately halving the size of storage systems necessary to comply with a maximum allowable ramp-rate given by a grid code regulation regarding the state of the art, reducing thus investment costs in the plant and/or carrying out a rationalized use of the energy storage system, in such a way that in order to achieve the same maximum fluctuation ramp, a minor use is done of the energy storage system, minimizing the losses and extending its working life, and therefore reducing the plant operational costs.

BACKGROUND OF THE INVENTION

Photovoltaic (PV) solar energy production depends on the global irradiance available, which depends, for a determined location, on the day of the year and the time of the day, but also on meteorological effects such as clouds or aerosols in the particular location of the photovoltaic panels.

Therefore, along any given day, the photovoltaic solar power will vary importantly. On a sunny day, for example, it will show a predictable variation because of the different levels of irradiance along the day, and because of the different angles the sun will form during the day with the photovoltaic solar panels as a function of the type of tracking capacity they have.

On a cloudy day, the production will show additional variations that can be much faster depending on the photovoltaic plant size and the speed to which the clouds move over it, wherein the power curves will be completely different for a clear day, a partly cloudy day and a completely cloudy day.

Cloudiness is difficult to forecast and fast with respect to its effects, so it can cause fluctuations in the photovoltaic plants production which cause problems in the electrical system stability. The electrical grid operators have carried out several researches about the fluctuations effects since, as they cannot be foreseen, the grid has to be provided with enough control capacity to absorb them. The maximum power variations in photovoltaic plants may even reach 90% of nominal power in very short time intervals, of less than a minute.

In the case of a wind farm, the wind resource obtained is also variable depending on the meteorological conditions, so the effects are similar to those present in photovoltaic plants, although with different dynamics and time schedules.

One of the ways to solve power fluctuations is to control the generation by limiting the power variation maximum speed, typically with the maximum ramp value which power variation may have in each control cycle. That requires predicting fluctuations and acting in advance limiting the production of the plant. In order to predict fluctuations, it would be required to accurately assess the modifications of the meteorological parameters causing them. Poor forecast of the meteorological variables and the effects thereof on the plant production may cause great losses in this process and may justify the investment in energy storage systems.

The way the established regulations deal with this problem is by setting power variation maximum ramps to the power being fed in the grid by the intermittent generation plants. In this way, it can be ensured that the power variation of a plant, or a group of plants, does not exceed the dynamics with which other plants in the system may increase or reduce power, so that the production and consumption balance is not altered at each moment.

In order to set these values, possible power variation speed for thermal power plants, between 2.5%-10% of its nominal power per minute, being part of the manageable generation, is usually taken as a reference. Thereby, it is ensured that the rest of the system, if it is provided with enough control capacity, may respond to quick power variations in the intermittent power generation plants. Another option is to consider that the aggregation of nearby plants will produce a variation in the power obtained as a sum of all of them, which is less than the variations from each individual plant (filtering effect), so it is possible to reduce the store requirements.

The plants with energy storage may control variation speed of the output by means of energy charging and discharging of the storage systems. For example, a 1.2 MWp plant can be added a 1 MW-560 kWh battery system with which output power variations from the plant can be controlled according to a maximum ramp determined by the control system.

There are different strategies known from the state of the art used in solar and wind generation plants and having several energy storage technologies, where the usual way to control the power fluctuations is by storing the excess in the storage or transferring the deficit from the storage, so that when power increments are produced, the battery is charged so that the production being fed to the grid do not have great oscillations, whereas when power drops occur, the battery provides the power to keep up with the production being fed to the grid without great oscillations, where this procedure can be carried put in different ways obtaining different results.

The immediate way of doing this, referred to as ramp-rate control, is with a control algorithm which, in the time cycle being defined, sets a charging or discharging value for the storage system, so that in the next cycle there is no value with a deviation higher than the one allowed by the maximum allowable ramp-rate value, implying lower cycling degradation.

Publication "Storage requirements for PV power ramp-rate control. Sol. Energy 99, 28-35 from the authors Marcos, J., Storkël, O., Marroyo, L., Garcia, M., Lorenzo, E., 2014", discloses a ramp-rate control strategy that complies with a given allowable ramp-rate variation. In particular, an equation was given to calculate the storage capacity required to support the worst case fluctuation at a photovoltaic plant. In other words, a fluctuation when the photovoltaic plant is in full operation in clear sky conditions compared to completely cloudy conditions, or vice versa. As the sign of the first fluctuation is unknown, a double capacity battery is required to absorb both the upward and downward fluctuations based on currently-available knowledge.

DESCRIPTION OF THE INVENTION

The present invention solves the technical problem stated, by means of a method for the control of power ramp-rates minimizing energy storage requirements in intermittent power generation plants, such as for example a photovoltaic solar plant, a wind turbine or a wind farm, which minimizes the energy storage requirements reducing significantly up to halving the size of storage systems necessary to comply with a maximum allowable ramp-rate given by a grid code regulation respect the state of the art, reducing thus investment costs in the plant and/or carrying out a rationalized use of the energy storage system, in such a way that in order to achieve the same maximum fluctuation ramp, a minor use is done of the energy storage system, minimizing the losses and extending its working life, and therefore reducing the plant operational costs.

In any of the strategies mentioned in the background of the invention section, as the control of the plant power output is carried out by charging or discharging a finite capacity storage system, it is necessary to bring the state of charge SOC(t) to a defined value, that is, a target SOC(t), $SOC_{tar}(t)$, typically around 50%. Thus, the storage system will not reach its allowed maximum and minimum technical values, and it will ensure the storage system has enough stored energy and power charging capacity enough to achieve its functionality. The strategy of charging the storage system when the SOC(t) lowers down from a determined value, and discharging it when the SOC(t) goes up from determined value, will be referred to as algorithm for the state of charge; or as a charging and discharging component which depends on the spacing between SOC(t) at each moment and the target SOC, $SOC_{tar}(t)$.

Therefore, the storage system design to be incorporated in an intermittent generation plant is carried out determining in the first place the global operation strategy. Up to now, strategies for control tracking of fluctuation maximum ramps and ramp delay have been mentioned. From those fluctuations of the solar or wind resource foreseen and the strategy to be followed, the power charging and discharging capacity that the storage system associated to the generation plant will require, will be determined. Thus, the total power capacity of the energy storage system and a target SOC, $SOC_{tar}(t)$, will be measured, so that the storage system can provide the specified charging and discharging capacity. A strategy will be included in order that, during operation, the storage system SOC (t) does not deviate too much from the target, so that the achievement of the required functionality is ensured over time.

The method for the control of power ramp-rates minimizing energy storage requirements for complying with a maximum allowable ramp-rate value to the power being fed in the grid, $P_G(t)$, given by a grid code regulation of the present invention, which can be applied to, for example, a photovoltaic solar plant, and where the energy storage system is for example a battery, comprises:

a stage for calculating the maximum plant power, $P_{Max}(t)$, and the minimum plant power, $P_{Min}(t)$ of the instantaneous power generated by the intermittent power generation plant, P(t);

a stage for determining the worst possible fluctuation that can occur in the instantaneous power generated by the intermittent power generation plant, P(t), wherein the worst possible fluctuation is one of the two following fluctuations: a positive fluctuation being calculated between the instantaneous power P(t) and the maximum plant power, $P_{Max}(t)$ and a negative fluctuation being calculated between the instantaneous power P(t) and the minimum plant power, $P_{Min}(t)$;

a stage for calculating dynamically the target state of charge, $SOC_{tar}(t)$, of a energy storage system required to support the worst possible fluctuation; and a control stage wherein the state of charge SOC(t) of the energy storage system associated to the difference between the power being fed in the grid, $P_G(t)$, and the instantaneous power generated by the intermittent power generation plant, $P_{PV}(t)$, is modified accordingly to the target state of charge, $SOC_{tar}(t)$ if the previous value of the target state of charge, $SOC_{tar}(t-1)$, is able to support the worst possible fluctuation or is not modified if the previous value of the target state of charge, $SOC_{tar}(t-1)$, is able to support the worst possible fluctuation.

The invention takes into account that both (i) the conditions for the output power fluctuation control of the plant, and (ii) the conditions of the state of charge of the storage system may be dynamic in such a way that they vary according to other parameters. The variation records make sense knowing the application and how the renewable intermittent generation plants, object of the present invention, work.

Therefore, as a function of the maximum plant power ($P_{Max}(t)$) and the minimum plant power $P_{Min}(t)$), it is then possible to obtain the SOC needed to smooth out any potential fluctuations, both positive and negative.

If the intermittent power generation plant is a photovoltaic solar plant, the instantaneous photovoltaic plant power generated, $P_{PV}(t)$, for specific values of irradiance, G(t), and cell temperature, $T_c(t)$, can be easily estimated with a parametric model of the photovoltaic plant under consideration. It is possible to estimate at each moment, the photovoltaic plant production limits, i.e., $P_{PV,Max}(t)$, preferably the photovoltaic plant power under clear sky conditions, and $P_{PV,Min}(t)$, preferably the photovoltaic plant power under totally cloudy sky conditions in which only the diffuse light reaches the photovoltaic arrays. These powers $P_{PV,Max}(t)$, $P_{PV,Min}(t)$, represent both the maximum and minimum power respectively that can occur at the photovoltaic plant at that moment in time.

If the intermittent power generation plant is a wind turbine or a wind farm, the instantaneous wind turbine or wind farm power generated, $P_{WT}(t)$, for specific values of meteorological variables, such as wind speed, $v_w(t)$, and temperature, T(t), can be easily estimated with a parametric model of the wind turbine under consideration, obtaining the wind turbine production limits, i.e., $P_{WT,Max}(t)$ and $P_{WT,Min}(t)$, Preferably $P_{WT,Max}(t)$ is the rated power of the wind turbine or wind farm and $P_{WT,Min}(t)$ is another value different to the rated power.

In this way, it is possible to calculate the maximum power variation that can take place, either positive or negative, from the instantaneous power generated by the intermittent plant, P(t). So, as a function of the actual instantaneous power, it is then possible to obtain the state of charge (SOC) needed in order to either absorb or provide the necessary energy depending on the nature of the fluctuation, either upward or downward respectively.

In other words, and for a photovoltaic solar plant, it is possible to control the SOC of the energy storage system close to 100% on a clear day and with the photovoltaic plant in full operation, given the fact that the only event that could possibly occur is a downward fluctuation, which will be mitigated by providing energy from the energy storage system. Whilst, on a cloudy day with the photovoltaic plant operating under diffuse irradiance with low power the energy storage system will be at a low state of charge (SOC)

in order to absorb the only possible upward fluctuation that could occur. Any other intermediate state of production will imply a $SOC_{tar}(t)$ reference that will be variable as a function of the actual weather conditions. In this way, the capacity needed with this invention is the capacity necessary to mitigate the worst fluctuation case, so reducing significantly up to halving currently state of the art requirements.

Therefore, the stage of setting the target state of charge, $SOC_{tar}(t)$, of the energy storage system dynamically, according to the maximum plant power, $P_{PV,Max}(t)$, and the minimum plant power, $P_{PV,Min}(t)$, is preferably carried out through specific values of irradiance, $G(t)$, and measured cell temperatures ($T_c$) to allow the energy storage system to provide sufficient power to cover a decrease in irradiance or otherwise to absorb excess power.

Preferably, $P_{Min}(t) = A \times P_{Max}(t)$, wherein A is comprised in the interval (0,1-0,3) considering that $P_{Min}(t)$ corresponding to the power under maximum cloudiness conditions is equivalent to $(A \times 100)\%$ of $P_{Min}(t)$ for a clear day for a photovoltaic power plant.

The available capacity of the energy storage system required for discharging in the event of the maximum possible downward fluctuation ($C_{BAT,d}$) is the stored energy that needs to be injected into the grid in order to mitigate this fluctuation. On the other hand, the capacity required to charge in the event of the maximum upward fluctuation ($C_{BAT,c}$) is the energy required to be stored in the energy storage system to absorb this fluctuation.

When the photovoltaic plant is operating at any point close to midday, when $P_{PV,Max}(t) = P_N$, the sum $C_{BAT,d} + C_{BAT,c} = C_{BAT}$. This means there is only one $SOC(t)$ point which complies with the ramp limitation imposed. However, any other time of day, the sum $C_{BAT,d} + C_{BAT,c} < C_{BAT}$, which means that not only is there a single point that meets the ramp limitation but an entire zone. If the $SOC(t)$ is within this zone, no modification will be required, a fact that makes it possible to reduce the energy storage system cycling degradation should this be necessary. This translates into the following conditions:

if $SOC(t) < C_{BAT,d}(t)$ $SOC_{tar}(t) < C_{BAT,d}(t)$ else if $C_{BAT} - SOC(t) < C_{BAT,c}(t)$ $SOC_{tar}(t) = C_{BAT,c}(t)$ else $SOC_{tar}(t) = SOC_{tar}(t-1)$ wherein $C_{BAT,d}(t)$ is the available capacity of the energy storage system required for discharging in the event of a maximum possible downward fluctuation associated to the maximum negative power variation that can take place, $C_{BAT,c}(t)$ is the capacity required to charge in the event of the maximum upward fluctuation associated to the maximum positive power variation that can take place, and $SOC(t)$ is the state of charge of the energy storage system associated to the difference between the power being fed in the grid, $P_G(t)$, and the instantaneous power generated by the photovoltaic plant, $P_{PV}(t)$, The $SOC(t)$ of the energy storage system is continuously adjusted to comply with both the ramp rate limitation implemented and any possible fluctuations that could take place. Furthermore, as mentioned above, at the beginning and end of the day when $E_{BAT}(t)$ values comply with the ramp rate limitation, the $SOC(t)$ remains constant.

Preferably, the stage for calculating the maximum plant power, $P_{Max}(t)$, and the minimum plant power, $P_{Min}(t)$ of the instantaneous power generated by the intermittent power generation plant, $P(t)$ is carried out for each one of a set of plants for calculating the maximum power, $P_{Max}(t)$, and the minimum power, $P_{Min}(t)$ of the set of plants.

Optionally, the method further comprises a stage of setting the dynamic component of the ramp defined as the slope with which the power in the plant is to be varied in each control stage, according to the state of charge of the energy storage system, $SOC(t)$.

In case the stage of setting the power variation maximum ramp to the power being fed in the grid by the intermittent power generation plant, is carried out by means of the stage of setting the dynamic component defined as the slope with which the output power in the plant is to be varied in each control cycle, according to the state of charge of the energy storage system, $SOC(t)$, it is ensured that the power variation of a plant, or a group of plants, does not exceed the maximum dynamics allowed; fixed accordingly in order that other plants in the system may increase or reduce power, so that the production and consumption balance of the whole system is not altered at each moment.

Thus, if the state of charge is below a reference value, the slopes are modified so as to help the storage system to be charged. If the state of charge of the storage system is higher than the reference value, the slopes are modified so as to help discharging the storage system, always achieving the maximum slopes allowed.

Thus, the use of the energy storage system is reduced (number of charging/discharging cycles in case of a battery), since by means of using dynamic limiting maximum ramps for power variation, according to the state of charge of the energy storage system, the storage system deviates the least possible from the state of charge (SOC) set as a target.

Limiting maximum ramps for power variation of the total power generated by a group of plants can leverage the attenuation dispersion and, therefore, reduce the value of the required energy storage system. This makes sense in the case of both an island where all generated power goes to a single line, as in the case of several plants are connected to the same substation. The maximum and minimum power produced by all plants, preferably a wind farm or a photovoltaic plant, would be calculated as the sum of the maximum and minimum of each range.

In the next table, different parameters are shown between the present invention and the Publication "Storage requirements for PV power ramp-rate control. Sol. Energy 99, 28-35 from the authors Marcos, J., Storkël, O., Marroyo, L., Garcia, M., Lorenzo, E., 2014", of the state of the art, showing the improvement in the different parameters due to said method for the case in which the energy storage system is a battery.

| Results | State of the art | Invention |
| --- | --- | --- |
| Theoretical Capacity $C_{BAT}$ (kWh) | 24558 | 12279 |
| Effective Capacity Used $C_{BAT,\ used}$ (kWh) | 23678 | 11703 |
| Energy through the energy storage system (% Total Production) | 6.39 | 6.15 |

Thus, the method of the invention allows $C_{BAT}$ to be halved the $C_{BAT}$ required in Publication "Storage requirements for PV power ramp-rate control. Sol. Energy 99, 28-35 from the authors Marcos, J., Storkël, O., Marroyo, L., Garcia, M., Lorenzo, E., 2014", of the state of the art.

DESCRIPTION OF THE DRAWINGS

To implement the present description and in order to provide a better understanding of the characteristics of the invention, according to a preferred embodiment thereof, a set of drawings is attached as part of this description, with an illustrative but not limitative purpose, which represents the following.

PREFERRED EMBODIMENT OF THE INVENTION

A detailed description of a preferred embodiment of the present invention is now described, according to FIGS. 1 to 6 referred to above.

The method for the control of power ramp-rates minimizing energy storage requirements for complying with a maximum allowable ramp-rate value (1) to the power being fed in the grid, $P_G(t)$, given by a grid code regulation of the present invention, which can be applied to, for example, a photovoltaic solar plant, and where the energy storage system is for example a battery, comprises:
  a stage for calculating the maximum plant power, $P_{PV,Max}(t)$, and the minimum plant power, $P_{PV,Min}(t)$ of the instantaneous power generated by the photovoltaic plant, $P_{PV}(t)$ (2);
  a stage for determining the worst possible fluctuation that can occur in the instantaneous power generated by the photovoltaic plant, $P_{PV}(t)$, wherein the worst possible fluctuation is one of the two following fluctuations: a positive fluctuation being calculated between the instantaneous power $P_{PV}(t)$ and the maximum plant power, $P_{PV,Max}(t)$ and a negative fluctuation being calculated between the instantaneous power $P_{PV}(t)$ and the minimum plant power, $P_{PV,Min}(t)$;
  a stage for calculating dynamically the target state of charge, $SOC_{tar}(t)$, of a energy storage system required to support the worst possible fluctuation (3); and
  a control stage (4) wherein the state of charge $SOC(t)$ of the energy storage system associated to the difference between the power being fed in the grid, $P_G(t)$, and the instantaneous power generated by the photovoltaic plant, $P_{PV}(t)$, is modified to the target state of charge, $SOC_{tar}(t)$ if the previous value of the target state of charge, $SOC_{tar}(t-1)$, is able to support the worst possible fluctuation or is not modified if the previous value of the target state of charge, $SOC_{tar}(t-1)$, is able to support the worst possible fluctuation.

Figure 1:
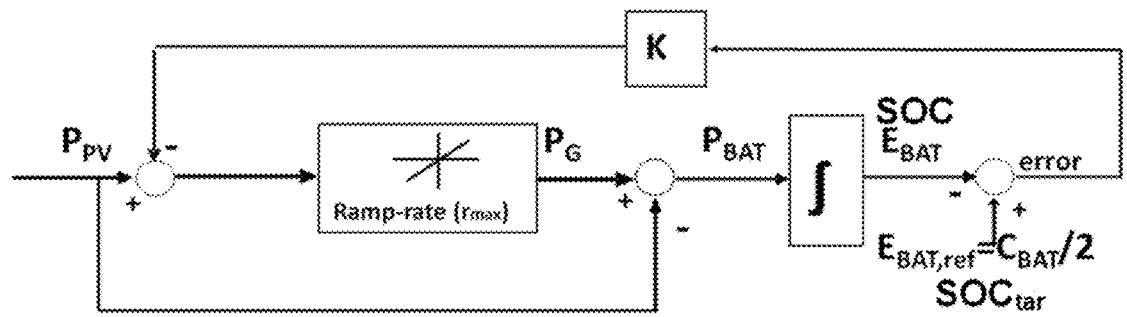
FIG. 1 shows a ramp-rate control model according to the method disclosed in publication Storage requirements for PV power ramp-rate control. Sol. Energy 99, 28-35 from the authors Marcos, J., Storkël, O., Marroyo, L., Garcia, M., Lorenzo, E., 2014", of the state of the art.
Figure 2:
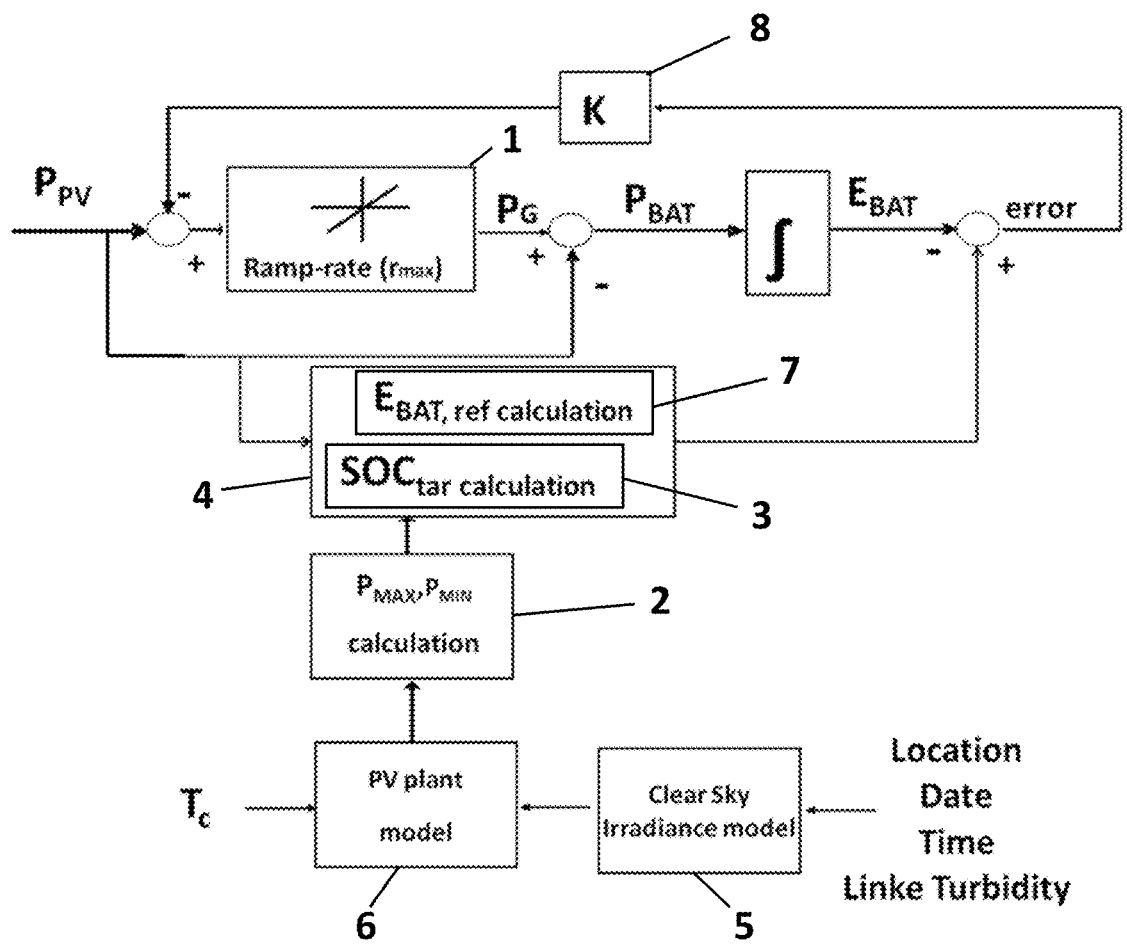
FIG. 2 shows a ramp-rate control model according to the method for the control of power ramp-rates minimizing energy storage requirements in intermittent power generation plants of the invention.

The instantaneous PV plant power generated, $P_{PV}(t)$, for specific values of irradiance, $G(t)$, and cell temperature, $T_c(t)$, are estimated with a parametric model of the PV plant under consideration. It is possible to estimate at each moment, the PV plant production limits: the PV plant power under clear sky conditions, $P_{PV,Max}(t)$, and the PV plant power under totally cloudy sky conditions in which only the diffuse light reaches the PV arrays, $P_{PV,Min}(t)$. These powers represent both the maximum and minimum power that can occur at the PV plant at that moment in time. In this way, it is possible to calculate the maximum power variation that can take place, either positive or negative, from the instantaneous power generated by the PV plant, $P_{PV}(t)$. So, as a function of the actual PV power, it is then possible to obtain the state of charge needed in order to either absorb or provide the necessary energy depending on the nature of the fluctuation, either upward or downward respectively. FIG. 2 shows the control diagram showing a block that is able to calculate, through the measured cell temperature (Tc), the SOC value ($E_{BAT,ref}$) to allow the battery to provide sufficient power to cover a decrease in irradiance or otherwise to absorb excess power.

The calculation of $P_{PV,Max}(t)$ corresponds to the calculation of the PV power under clear sky conditions. This power can be obtained through the following stages:
  a) A clear sky irirradiance model (5).

The knowledge of the clear sky irradiance reaching the ground has been a key parameter in the field of solar irradiance modelling and evaluation. As a result, many empirical and physical models can be found in the literature (Bird and Hulstrom, 1980; Geiger et al., 2002; Gueymard, 1989; Kasten, 1980; Molineaux et al., 1998; Rigollier et al., 2000). Although, as will be seen later on, high accuracy is not required for the modelling of clear sky days for the goodness of the control, these models have been well validated and their performance on very clear condition measurements are within 4% in term of standard deviation (Ineichen, 2006). For the purpose of our study, the model selection criteria must be based on both implementation simplicity and input parameter availability (Linke turbidity or aerosol optical depth). In this way, the clear sky model of the European Solar Irradiance Atlas (ESRA) which only needs the Linke turbidity as an input parameter has been implemented (Rigollier et al., 2000). Monthly values of the Linke turbidity factor are sufficient for the purpose of our study and can be obtained from (SODA, n.d.).

In this model, the global horizontal irradiance for clear sky, $G_c(0)$, is split into the direct component, $B_c(0)$ and given by Eq.(7):

$$B_c(0) = B_0 \varepsilon_0 \sin \gamma_s \exp(-0.8662\, T_L m \delta_R) \qquad (7)$$

where $B_0$ is the solar constant (1367 Wm$^{-2}$), $\varepsilon_0$ is the eccentricity correction; $\gamma_s$ is the solar altitude angle (0° at sunrise and sunset); $T_L$ is the Linke turbidity factor for an air mass equal to 2; m is the relative optical air mass; $\delta_R$ is the integral Rayleigh optical thickness that depends on the precise optical path and hence on relative optical air mass, m, and its parameterization can be obtained in (Kasten, 1996).

And the diffuse component, $D_c(0)$, given by Eq.(8):

$$D_c(0) = B_0 \varepsilon_0 T_{rd}(T_L) F_d(\gamma_s, T_L) \qquad (8)$$

In this equation, the diffuse irradiance is expressed as the product of the diffuse transmission function at zenith (i.e. sun elevation 90°), $T_{rd}$, and diffuse angular function, $F_d$.

Further information about the calculation of these parameters can be found in (Rigollier et al., 2000).

b) PV plant model (6)

First of all, cell temperature, $T_c$, is required to calculate the PV module overheating losses. In this study, several temperature sensors have been recording data every 5 sec. In case cell temperature sensors are not available, $T_c$ can be calculated on the basis of ambient temperature ($T_a$), using the well-known equation Eq.(9):

$$T_C = T_A + \frac{NOCT - 20}{800} \cdot G_m \tag{9}$$

where NOCT is the nominal operation cell temperature obtained from the manufacturer datasheet, in ° C., and $G_m$ is the irradiance measured in the plane of the array, in W·m$^{-2}$. Notice that in this case both an irradiance sensor and ambient temperature sensor are required.

Later, once both components of the global horizontal irradiance have been obtained, the irradiance that reaches the PV generators must be calculated. To do so, the angle of incidence, $\beta$, and the PV generator orientation, $\alpha$, at every instant in time must be calculated. All the expressions which allow these parameters for the main kinds of tracking systems can be found in Narvarte and Lorenzo, 2008.

Subsequently, based on the position of the PV generator, the irradiance can be calculated in the plane of the generator, $G_c(\beta,\alpha)$. In order to obtain the value of the irradiance over an inclined plane, several models have been proposed (Hay and Mckay, 1985; Hay, John E., Davis, 1980; Klucher, 1979; Lorenzo, 2011; Muneer, 1990; Perez et al., 1987; Reindl et al., 1990) which typically split the solar irradiance in beam irradiance, $B_c(\beta,\alpha)$; diffuse irradiance, $D_c(\beta,\alpha)$; and reflected irradiance, $R_c(\beta,\alpha)$. As was mentioned above, for the purpose of this application, as a great deal of precision is not required, any of the models proposed in the literature will be valid. In this case, the Hay-Davies model (Hay, John E., Davis, 1980) was chosen. Further information about the parameters and equations implemented can be found in (Hay, John E., Davis, 1980; Lorenzo, 2011).

Although the method is sufficiently accurate for the purpose of this study, It is worth noting that in order to improve the accuracy of the calculation, it is possible to take into account the assessment of power losses caused by shading (Martinez-Moreno et al., 2010), dirt and incidence (Martin and Ruiz, 2001) and spectrum (Ruiz, 1999).

The next stage is to obtain the maximum output power ($P_{DC}(t)$) which is calculated using Eq.(10):

$$P_{DC}(t) = P^* \frac{G_c(t)}{G^*} \frac{\eta(t)}{\eta^*} \tag{10}$$

where $P^*$ is the maximum power under standard test conditions (STC, defined by a normal irradiance of $G^*=1000$ W.m$^{-2}$ and a cell temperature of $T_c=25°$ C., and AM1.5 spectrum), $\eta(t)$ is the efficiency as a function of the irradiance and cell temperature, $T_c$, and $\eta^*$ is the efficiency under STC, $$\eta(t) = \frac{P^*}{AG^*}$$

where A is the active area of the PV generator.

The simple implemented model, but with sufficient accuracy for the purpose of the study, only takes into account the dependence of efficiency with temperature (Eq.(11)):

$$\frac{\eta(t)}{\eta^*} = 1 + \gamma(T_C(t) - T_C^*) \tag{11}$$

Finally, the inverter is characterized by its nominal output power ($P_I$) and three experimental parameters, ($k_0$, $k_1$ and $k_2$) used to calculate its power efficiency ($\eta_I$) as it is shown in Jantsch et al., 1992 through equation Eq.(12):

$$\eta_I(t) = \frac{P_{AC}(t)}{P_{DC}(t)} = \frac{p_{ac}(t)}{p_{ac}(t) + (k_0 + k_1 p_{ac}(t) + k_2 p_{ac}^2(t))} \tag{12}$$

where $p_{ac}(t)=P_{AC}(t)/P$, being $P_{AC}$ the output AC power of the inverter and the mentioned parameters $k_0$, $k_1$ and $k_2$, which must be fitted either from the power efficiency curve provided by the inverter manufacturer or from experimental measurements (Muñoz et al., 2011).

c) $P_{PV,Max}(t)$ and $P_{PV,Min}(t)$ calculation

Once these parameters are known $P_{PV,Max}(t)$ is given by Eq.(13).

$$P_{PV,Max}(t) = P_{AC}(t) = P^* \frac{G_c(t)}{G^*}(1 + \gamma(T(t)_C - T_C^*))\eta_I(t) \tag{13}$$

And $P_{PV,Min}(t)$ corresponds to the power under maximum cloudiness conditions. A rough approach to define the cloudy day but good enough for the purpose of the control is to consider it as 10% of a clear day, which corresponds with the minimum diffuse irradiance observed. In this way $P_{PV,Min}(t)$ is given by Eq.(14).

$$P_{PV,Min}(t) = 0.1 \, P_{PV,Max}(t) \tag{14}$$

Figure 3:
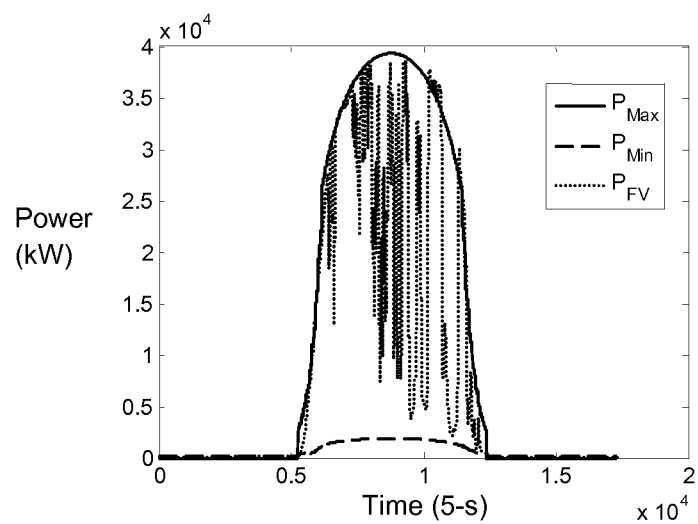
FIG. 3 shows a graph wherein the variation in a day of the instantaneous power generated by the photovoltaic plant, $P_{PV}(t)$, the maximum plant power, $P_{PV,Max}(t)$, and the minimum plant power, $P_{PV,Min}(t)$. are shown.

Note that any other losses, such as transformer and wiring losses, can be implemented to improve the accuracy of the calculation of $P_{PV,Max}(t)$ and $P_{PV,Min}(t)$. By way of example, FIG. 3 shows these limits and the real PV power, $P_{PV}(t)$, for the 21 Nov. 2012.

Note that there are some points in which $P_{PV}(t)$ exceeds the $P_{V,Max}(t)$ limit modelled. This is because, on a day with scattered clouds, there may be some reflections between the irradiance that reaches the ground and the clouds that cause these values to be slightly above normal. In any case, these are individual cases that do not affect the proper functioning of the application. On the other hand, it can be seen that $P_{PV,Max}(t)$ at the beginning and end of the day does not behave as a perfect bell curve as was to be expected. This is because we are taking into account the shade losses of the PV plant in order to get a more precise result, although this is not necessary.

d) SOC reference calculation

Considering the fact that both the maximum and minimum power limits are well-known, it makes sense to implement a SOC control which takes into account these two limits. It is possible to control the SOC reference of the storage system depending on the nature of the day under consideration. In other words, it is possible to control the SOC of the storage system close to 100% on a clear day and with the PV plant in full operation, given the fact that the only event that could possibly occur is a downward fluctuation, which will be mitigated by providing energy from the battery. Whilst, on a cloudy day with the PV plant operating under diffuse irradiance with low power the battery will be at a low state of charge in order to absorb the only possible upward fluctuation that could occur. Any other intermediate state of production will imply a SOC reference that will be variable as a function (8) of the actual weather conditions. To evaluate this strategy, we will work with k=6.

Figure 4:
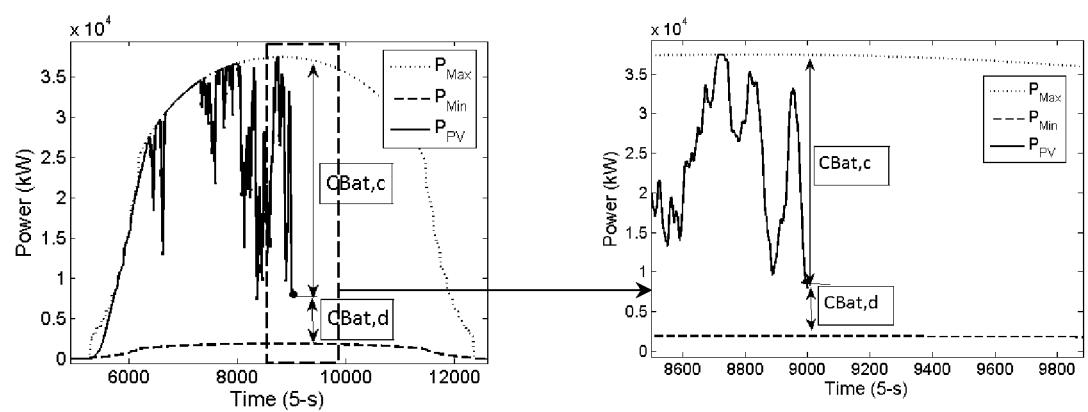
FIG. 4 shows on the left side a graph wherein the stage for calculating dynamically the target state of charge, $SOC_{tar}(t)$, of a energy storage system required to support the worst possible fluctuation is shown for an instant t of the day of FIG. 3, and on the right side a detail of said graph.

FIG. 4 shows the capacity required at a time close to midday on the 21 Nov. 2012 in order to correctly absorb both any potential upward and downward fluctuations. Note that, on one hand, the available capacity required for discharging in the event of the maximum possible downward fluctuation ($C_{BAT,d}$) is the stored energy that needs to be injected into the grid in order to mitigate this fluctuation. On the other hand, the capacity required to charge in the event of the maximum upward fluctuation ($C_{BAT,c}$) is the energy required to be stored in the energy storage system to absorb this fluctuation. $C_{BAT,d}$ and $C_{BAT,c}$ requirements are determined according to Eq.(5) (Ruifeng and Saha, 2010)

$$C_{BAT} = \frac{0.9 P^*}{3600}\left[\frac{90}{2 \cdot r_{MAX}} - \tau\right] \quad (5)$$

and are expressed by Eq.(15) and Eq.(16).

$$C_{BAT,d}(t) = \frac{0.9(P_{PV(t)} - P_{Min(t)})}{3600}\left[\frac{90}{2 \cdot r_{MAX}} - \tau\right] \quad (15)$$

$$C_{BAT,c}(t) = \frac{0.9(P_{Max(t)} - P_{PV(t)})}{3600}\left[\frac{90}{2 \cdot r_{MAX}} - \tau\right] \quad (16)$$

It is worth noting that when the PV plant is operating at any point close to midday, when $P_{PV,Max}(t)=P_N$, the sum $C_{BAT,d}+C_{BAT,c}=C_{BAT}$. This means there is only one SOC point which complies with the ramp limitation imposed. However, any other time of day, the sum $C_{BAT,d}+C_{BAT,c}<C_{BAT}$, which means that not only is there a single point that meets the ramp limitation but an entire zone. If the SOC is within this zone, no modification will be required, a fact that makes it possible to reduce the battery cycling degradation should this be necessary. This translates into the following control logic (Eq.(17)), indicated in FIG. 2 (7):

if $E_{BAT}(t)<C_{BAT,d}(t)$ $E_{BAT,ref}(t)=C_{BAT,d}(t)$ else if $C_{BAT}-E_{BAT}(t)<C_{BAT,c}(t)$ $E_{BAT,ref}(t)=C_{BAT,c}(t)$ else $E_{BAT,ref}(t)=E_{BAT,ref}(t-1)$ end (17)

Figure 5:
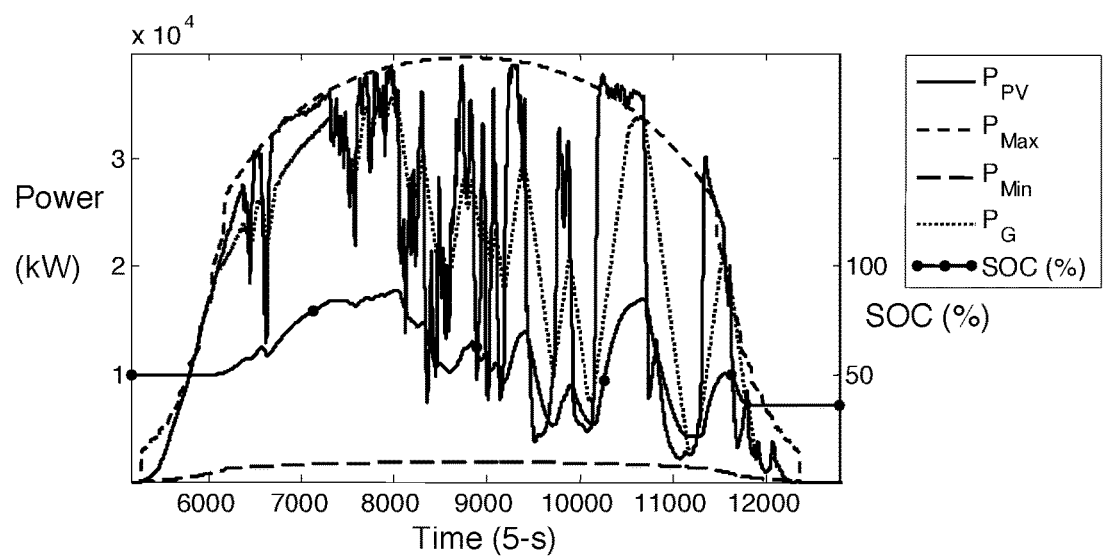
FIG. 5 shows a graph wherein the stage for calculating dynamically the target state of charge, $SOC_{tar}(t)$, of a energy storage system required to support the worst possible fluctuation is shown for the day of FIG. 3.

As an example, FIG. 5 shows the evolution of the SOC control proposed during the fluctuations on the 21 Nov. 2012. Despite the fluctuations recorded during the day, the strategy worked successfully. The SOC of the battery was continuously adjusted to comply with both the ramp rate limitation (1) implemented and any possible fluctuations that could take place. Furthermore, as mentioned above, at the beginning and end of the day when $E_{BAT}(t)$ values comply with the ramp rate limitation, so the SOC remains constant according to Eq.(17). The minimum theoretical effective battery required is $C_{BAT}$=12279 kWh. In this particular day, $SOC_{MAX}$=88.84% and $SOC_{MIN}$=21.43%. Thus, the effective capacity used in this day is $C_{BAT,used}$= $E_{BAT,MAX}-E_{BAT,MIN}$=8276 kWh. Again, this strategy allows $C_{BAT}$ to be halved the $C_{BAT}$ required in the method disclosed in Publication "Storage requirements for PV power ramp-rate control. Sol. Energy 99, 28-35 from the authors Marcos, J., Storkël, O., Marroyo, L., Garcia, M., Lorenzo, E., 2014", of the state of the art.

Figure 6:
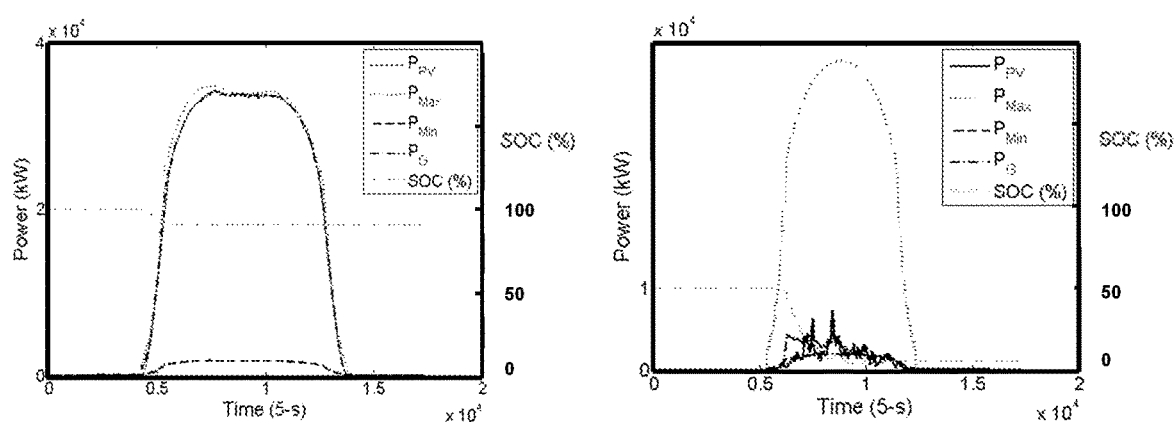
FIG. 6 shows the evolution of the SOC during a clear day on the left side and a cloudy day on the right side.

Furthermore, FIG. 6 shows the evolution of the SOC during a clear day (26 Aug. 2012) and a cloudy day (23 Nov. 2012). As was to be expected, during the clear day when $P_{PV}(t)$ is close to the $P_{PV,Max}(t)$ limit, once the SOC level of the battery can provide enough energy to mitigate the only possible downward fluctuation, it remains constant. On the other hand, on a cloudy day, when the SOC level of the battery is low enough to absorb the energy required to mitigate the only possible upward fluctuation, it also remains constant. Obviously, the lower the use of the battery the lower the losses and the lower the battery cycling degradation.

The invention claimed is:

1. A method for the control of power ramp-rates minimizing energy storage requirements in intermittent power generation plants for complying with a maximum allowable ramp-rate value to a power being fed in a grid, $P_G(t)$, given by a grid code regulation, by an intermittent power generation plant wherein the method comprises:

a stage for calculating a maximum plant power, $P_{Max}(t)$, and a minimum plant power, $P_{Min}(t)$ of an instantaneous power generated by the intermittent power generation plant, P(t), being the maximum plant power, $P_{Max}(t)$, and the minimum plant power, $P_{Min}(t)$, the maximum and minimum power respectively that can occur at the intermittent power generation plant at time t;

a stage for determining a worst possible fluctuation that can occur in the instantaneous power generated by the intermittent power generation plant, P(t), wherein the worst possible fluctuation is one of the two following fluctuations: a positive fluctuation being calculated between the instantaneous power P(t) and the maximum plant power, $P_{Max}(t)$ and a negative fluctuation being calculated between the instantaneous power P(t) and the minimum plant power, $P_{Min}(t)$;

a stage for calculating dynamically a target state of charge, $SOC_{tar}(t)$, of an energy storage system required to support the worst possible fluctuation; and a control stage wherein a state of charge SOC(t) of the energy storage system associated to a difference between the power being fed in the grid, $P_G(t)$, and the instantaneous power generated by the intermittent power generation plant, P(t), is modified accordingly to the target state of charge, $SOC_{tar}(t)$ if a previous value of the target state of charge, $SOC_{tar}(t-1)$, is not able to support the worst possible fluctuation or is not modified if the previous value of the target state of charge, $SOC_{tar}(t-1)$, is able to support the worst possible fluctuation.

2. The method of claim 1 wherein the maximum plant power, $P_{Max}(t)$, and/or the minimum plant power, $P_{Min}(t)$ are calculated through specific values of irradiance, G(t), and measured cell temperatures ($T_c$), wherein the intermittent power generation plant is a photovoltaic plant.

3. The method of claim 2 wherein in the stage for calculating the maximum plant power, $P_{Max}(t)$, and the minimum plant power, $P_{Min}(t)$ of the instantaneous power generated by the intermittent power generation plant, $P(t)$, the following condition is imposed:

$P_{Min}(t)=A\times P_{max}(t)$, wherein A is comprised in the interval (0,1-0,3).

4. The method of claim 2 wherein the stage for calculating the maximum plant power, $P_{Max}(t)$, and the minimum plant power, $P_{Min}(t)$ of the instantaneous power generated by the intermittent power generation plant, $P(t)$ is carried out for each one of a set of plants for calculating the maximum power, $P_{Max}(t)$, and the minimum power, $P_{Min}(t)$ of the set of plants.

5. The method of claim 2 further comprising a stage of setting the dynamic component of the ramp defined as the slope with which the power in the plant is to be varied in each control stage, according to the state of charge SOC (t) of the energy storage system.

6. The method of claim 1 wherein the maximum plant power, $P_{Max}(t)$, and/or the minimum plant power, $P_{Min}(t)$ are calculated through specific values of meteorological variables, such as wind speed, $v_w(t)$, and temperature, $T(t)$, wherein the intermittent power generation plant is a wind turbine or wind farm.

7. The method of claim 3 wherein the maximum plant power $P_{Max}(t)$ is the rated power of the wind turbine or wind farm and $P_{Min}(t)$ is another value different to the rated power.

8. The method of claim 7 wherein in the stage for calculating the maximum plant power, $P_{Max}(t)$, and the minimum plant power, $P_{Min}(t)$ of the instantaneous power generated by the intermittent power generation plant, $P(t)$, the following condition is imposed:

$P_{Min}(t)=A\times P_{Max}(t)$, wherein A is comprised in the interval (0,1-0,3).

9. The method of claim 7 wherein the stage for calculating the maximum plant power, $P_{Max}(t)$, and the minimum plant power, $P_{Min}(t)$ of the instantaneous power generated by the intermittent power generation plant, $P(t)$ is carried out for each one of a set of plants for calculating the maximum power, $P_{Max}(t)$, and the minimum power, $P_{Min}(t)$ of the set of plants.

10. The method of claim 7 further comprising a stage of setting the dynamic component of the ramp defined as the slope with which the power in the plant is to be varied in each control stage, according to the state of charge SOC (t) of the energy storage system.

11. The method of claim 6 wherein in the stage for calculating the maximum plant power, $P_{Max}(t)$, and the minimum plant power, $P_{Min}(t)$ of the instantaneous power generated by the intermittent power generation plant, $P(t)$, the following condition is imposed:

$P_{Min}(t)=A\times P_{Max}(t)$, wherein A is comprised in the interval (0,1-0,3).

12. The method of claim 6 wherein the stage for calculating the maximum plant power, $P_{Max}(t)$, and the minimum plant power, $P_{Min}(t)$ of the instantaneous power generated by the intermittent power generation plant, $P(t)$ is carried out for each one of a set of plants for calculating the maximum power, $P_{Max}(t)$, and the minimum power, $P_{Min}(t)$ of the set of plants.

13. The method of claim 6 further comprising a stage of setting the dynamic component of the ramp defined as the slope with which the power in the plant is to be varied in each control stage, according to the state of charge SOC (t) of the energy storage system.

14. The method of claim 1 wherein in the stage for calculating the maximum plant power, $P_{Max}(t)$, and the minimum plant power, $P_{Min}(t)$ of the instantaneous power generated by the intermittent power generation plant, $P(t)$, the following condition is imposed:

$P_{Min}(t)=A\times P_{max}(t)$, wherein A is comprised in the interval (0,1-0,3).

15. The method of claim 14 wherein the stage for calculating the maximum plant power, $P_{Max}(t)$, and the minimum plant power, $P_{Min}(t)$ of the instantaneous power generated by the intermittent power generation plant, $P(t)$ is carried out for each one of a set of plants for calculating the maximum power, $P_{Max}(t)$, and the minimum power, $P_{Min}(t)$ of the set of plants.

16. The method of claim 1 wherein the stage for calculating the maximum plant power, $P_{Max}(t)$, and the minimum plant power, $P_{Min}(t)$ of the instantaneous power generated by the intermittent power generation plant, $P(t)$ is carried out for each one of a set of plants for calculating the maximum power, $P_{Max}(t)$, and the minimum power, $P_{Min}(t)$ of the set of plants.

17. The method of claim 1 further comprising a stage of setting the dynamic component of the ramp defined as the slope with which the power in the plant is to be varied in each control stage, according to the state of charge SOC (t) of the energy storage system.

18. The method of claim 17 wherein the stage of setting the dynamic component of the ramp defined as the slope with which the power in the plant is to be varied in each control stage, according to the state of charge SOC (t) of the energy storage system is carried out for each one of a set of plants.

19. The method of claim 18 wherein the set of plants is a wind farm.

20. The method of claim 18 wherein the set of plants is a photovoltaic plant.

* * * * *